United States Patent [19]

Farquhar et al.

[11] Patent Number: 4,819,425
[45] Date of Patent: Apr. 11, 1989

[54] PRIMARY-SECONDARY VENTILATED FLOW MIXER NOZZLE FOR HIGH BYPASS TURBO FAN JET PROPULSION SYSTEM

[75] Inventors: Bannister W. Farquhar, Bellevue; Jagdish S. Sokhey, Renton, both of Wash.

[73] Assignee: The Boeing Company, Seattle, Wash.

[21] Appl. No.: 620,528

[22] Filed: Jun. 12, 1984

Related U.S. Application Data

[63] Continuation of Ser. No. 359,478, Mar. 18, 1982, abandoned.

[51] Int. Cl.[4] .............................. F02C 1/28; F02C 3/02
[52] U.S. Cl. ...................................... 60/226.1; 60/262
[58] Field of Search .............. 60/262, 231, 234, 226.1; 181/213, 216, 220; 239/265.17, 265.13; 415/DIG. 1

[56] References Cited

U.S. PATENT DOCUMENTS

| | | | |
|---|---|---|---|
| 2,882,992 | 4/1959 | Hausmann | 181/220 |
| 2,944,624 | 7/1960 | Morley . | |
| 2,957,310 | 10/1960 | Hyde . | |
| 2,959,917 | 11/1960 | McGehee . | |
| 3,002,341 | 10/1961 | Muzzy et al. . | |
| 3,041,836 | 7/1962 | Truman et al. | 60/261 |
| 3,065,818 | 11/1962 | Lombard et al. . | |
| 3,153,319 | 10/1964 | Young et al. . | |
| 3,227,240 | 1/1966 | Lee et al. . | |
| 3,592,291 | 7/1971 | Medawar et al. . | |
| 4,095,417 | 6/1978 | Banthin . | |
| 4,135,363 | 1/1979 | Packman | 60/262 |

FOREIGN PATENT DOCUMENTS

935379 8/1963 United Kingdom ................ 181/220

Primary Examiner—Louis J. Casaregola
Attorney, Agent, or Firm—Christensen, O'Connor, Johnson & Kindness

[57] ABSTRACT

A noise suppression high efficiency mixer nozzle for high bypass turbofan jet propulsion engines that minimizes energy losses by the provision of one or more vent openings located along the crests of the inner duct nozzle lobes to inject secondary flow into and along the primary flow boundary layers within the lobe crest interiors ahead of the locations where boundary layer flow separation otherwise tends to occur. Primary and secondary flow mixing initiated by secondary flow injection is completed within the converging terminal portion of the surrounding outer duct where the fan-shaped primary and secondary flow segments come together.

6 Claims, 5 Drawing Sheets

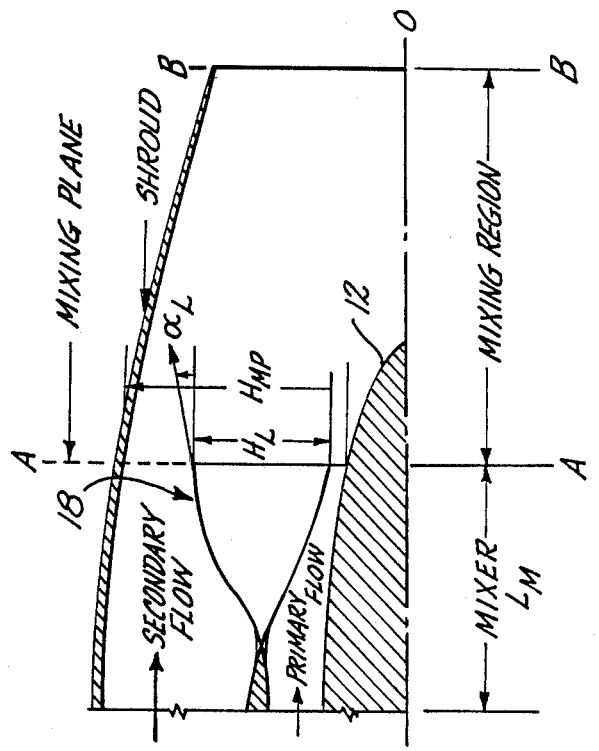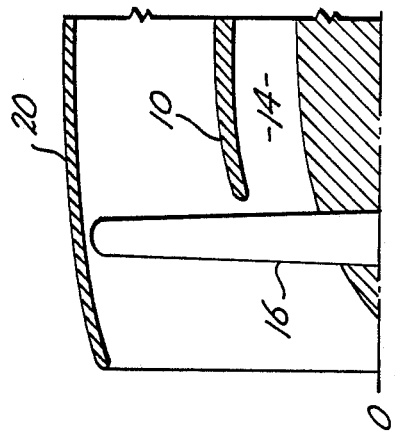
Fig. 1.

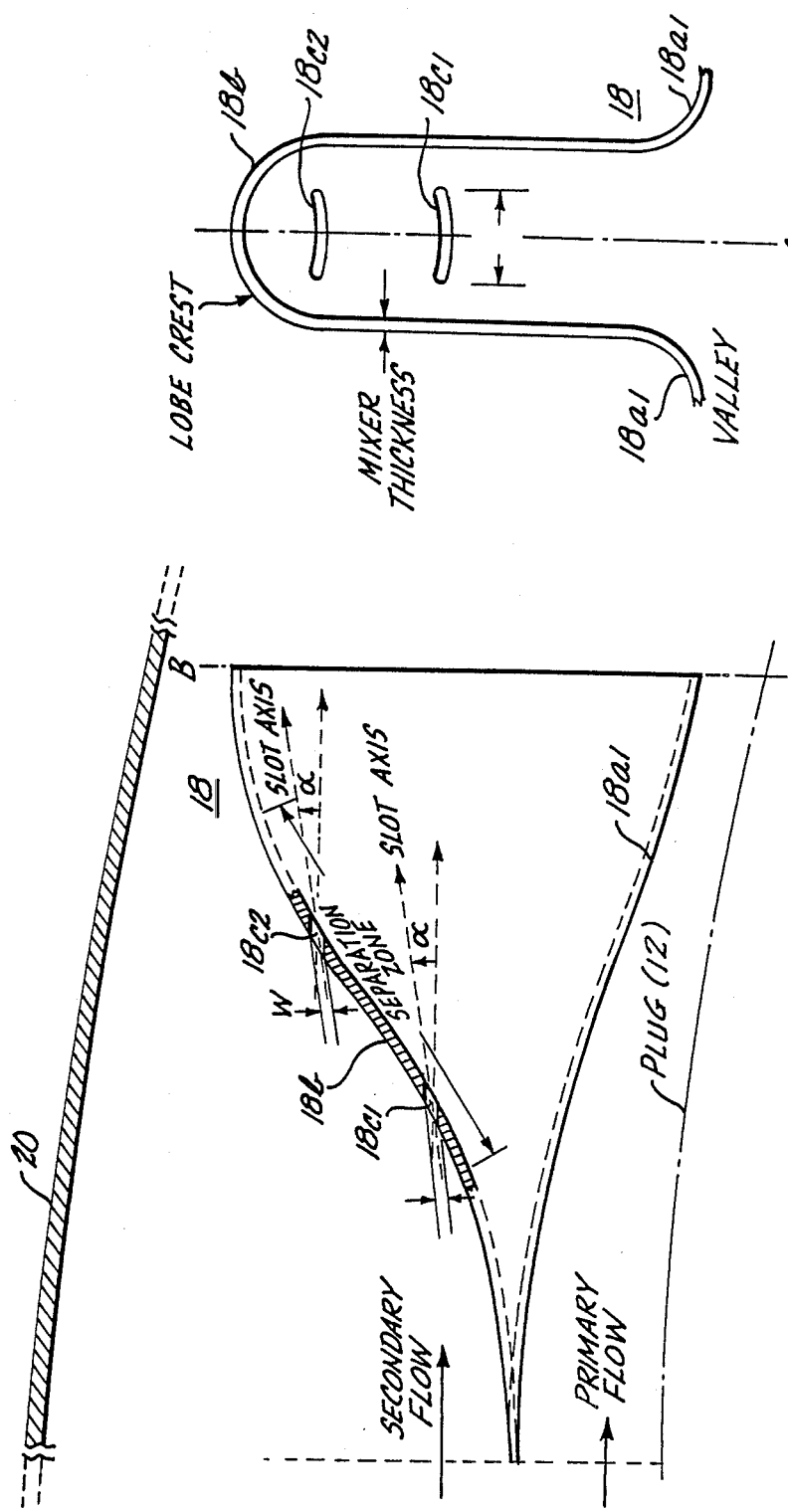

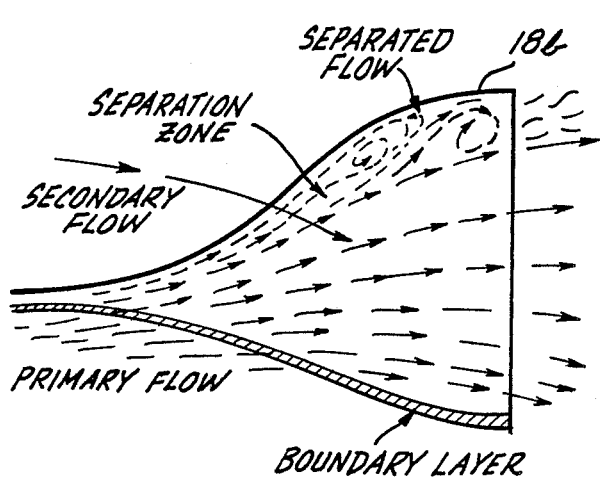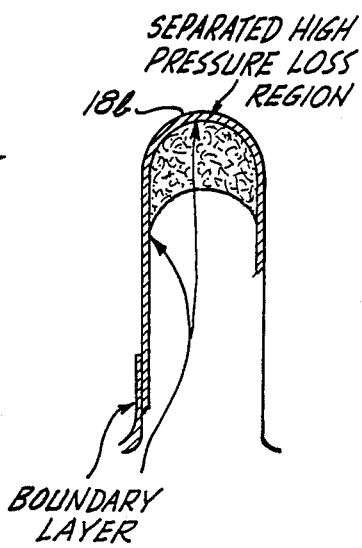
Fig. 6a.
Fig. 6b.
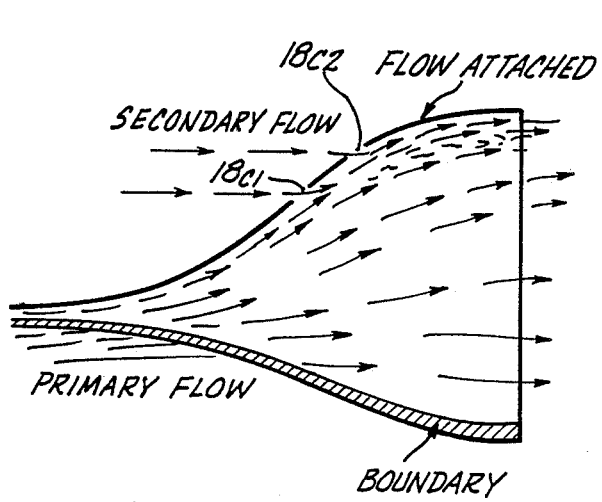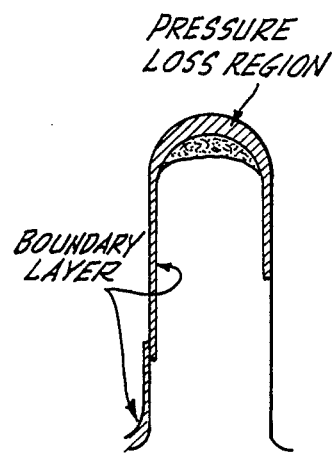
Fig. 7a.
Fig. 7b.

PRIMARY-SECONDARY VENTILATED FLOW MIXER NOZZLE FOR HIGH BYPASS TURBO FAN JET PROPULSION SYSTEM

This application is a continuation application based on prior copending application Ser. No. 359,478, filed Mar. 18, 1982 Primary-Secondary Ventilated Flow Mixer Nozzle for High Bypass Turbo Fan Jet Propulsion System (now abandoned).

BACKGROUND OF THE INVENTION

This invention relates to improved noise suppression mixer nozzles for high bypass ratio jet propulsion engines and, more particularly, to a novel means for increasing the thrust efficiency of such engines without diminishing the noise reduction effectiveness of mixer nozzles used therein.

Noise suppression mixer nozzles generally of the configuration to which the present invention applies are well known in the art. In such nozzles the primary flow consisting of heated combustion product gases and excess air passing through the combustion chamber are confined by an inner duct that terminates in a multilobed discharge nozzle. The secondary flow consisting of ram air and fan driven air surrounding the inner duct is confined by a surrounding outer duct. As the outer duct converges towards the discharge end of the engine and the inner duct undergoes its transition into the multilobed discharge nozzle, the annular secondary flow column is divided by the nozzle lobes into fan-shaped segments as the primary flow spreads outwardly in the nozzle lobes in the spaces between such segments. As the interdigitated or interspersed primary and secondary flow patterns leave the exit plane of the inner duct nozzle, accelerated mixing occurs, producing lower noise within the converging after portion of the outer duct before discharging as a resultant thrust jet from the latter.

Such forced mixing low noise turbofan engine nozzles have received considerable attention in recent years as a means to augment thrust and thereby conserve fuel in high bypass engines. As it happened, however, performance levels were well below theoretical hopes and expectations. Whereas noise reductions were achieved by such nozzles beyond those attained with most conventional nozzles, it was found that lengthening of the nozzle sufficiently to accommodate what was regarded as a sufficiently slow rate of flow expansion in the diverging inner duct nozzle lobes intended to achieve efficient attached flow patterns imposed such high weight and drag penalties as to virtually eliminate most of the gains theoretically expected from the lengthened nozzles.

These and other parameter juggling attempts to overcome such limitations and difficulties proved to be relatively ineffective. In each instance, the completeness of mixing, hence the degree of noise reduction achieved, remained below anticipated levels, and energy losses remained much higher than expected based on theoretical predictions. Attempts to compromise in favor of one objective left shortfalls in attaining the other.

The present invention provides a means to utilize such mixing nozzles to maximum advantage (i.e., maximum noise suppression, maximum fuel efficiency); and indeed to achieve actually better than predicted performance levels based on calculated expectations applied to a given basic set of nozzle design parameters (i.e., lobed mixer length, diametral span, number and configuration of lobes, outer duct relative size and configuration, etc.). It also incidentally provides a means to appreciably increase nozzle life and makes possible achieving these and related objectives using established nozzle construction methods and materials without adding anything to weight (indeed permits reducing the weight), bulk, complexity or cost. It is particularly important in its usefullness with high bypass ratio engines and with nozzles of high diameter-to-length ratios, although application of the principles involved is not limited to extreme designs.

SUMMARY OF THE INVENTION

In accordance with the invention, the described mixer nozzle incorporates vents extending across the crests of the inner duct mixer nozzle lobes, preferably in substantial axial alignment with secondary flow incident thereon, and through which secondary flow is injected into and along the boundary layers of the primary flow occurring within the lobe crest spaces. These one or more vent openings are located along such crests at one or more locations ahead of those at which primary flow separation otherwise tends to occur. Such secondary flow injections at those locations not only initiate primary/secondary flow mixing within the lobes, but they add flow booster energy to the primary flow so as to avoid flow separation. By thus maintaining attached flow patterns within the lobes attending full spreading of the primary flow radially outwardly into and along the lobes, maximum noise reduction is achieved through more complete mixing. Morever, the greatly reduced boundary layer separation occurring in the nozzle avoids the usual jet drive energy losses experienced in prior nozzles of this type. As a secondary advantage, the cooling action of the secondary flow injection into the primary flow nozzle lobes helps prolong nozzle life.

BRIEF DESCRIPTION OF THE DRAWINGS

FIG. 1 is a simplified sectional aide view of a high bypass turbofan jet propulsion engine illustrating the type of forced mixing nozzle to which the present invention applies;

FIG. 2 is an end view and FIG. 3 is a sectional side view of one lobe of the inner duct nozzle with injector vents placed in the lobe crest according to the teaching of the invention;

FIG. 6a is a diagrammatic side view and FIG. 6b is a diagrammatic end view illustrating the primary flow pattern in one lobe of a conventional forced mixing nozzle, whereas FIGS. 7a and 7b are views corresponding to FIGS. 6a and 6b providing a simplified illustration of the effect on the flow pattern with the teachings of the invention applied to the nozzle.

DETAILED DESCRIPTION REFERRING TO DRAWINGS

Figure 4:
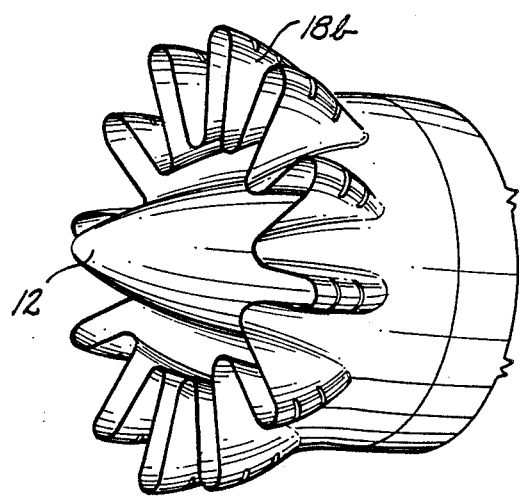
FIG. 4 is a perspective rear view of the inner duct multilobed nozzle in its presently preferred configuration.
Figure 5:
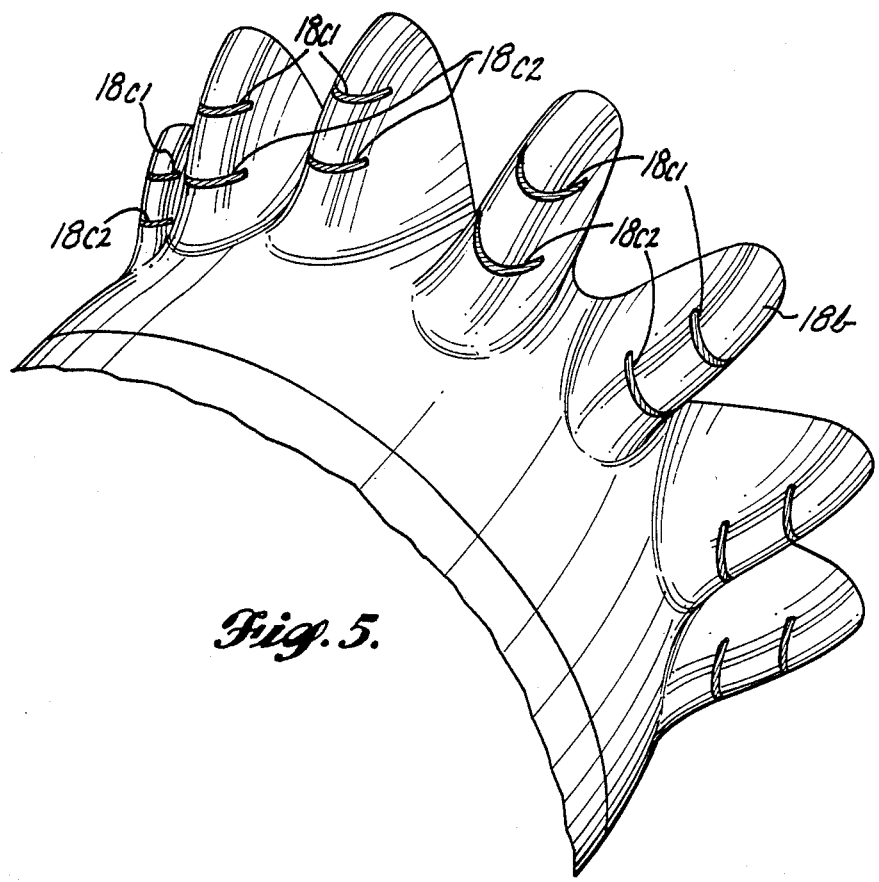
FIG. 5 is a forward perspective view of the same inner duct nozzle.

Observations which led to the present invention based on experimental evaluations revealed that apparently those geometry parameters of forced mixing nozzles of the type described when implemented in attempts to enhance the mixing effect also inherently introduce nozzle losses. These losses result from skin friction, flow turning and boundary layer separation within the inner duct nozzle lobes, particularly in the wider and shorter nozzle configurations desirable in the larger engines. Attempts to increase the transverse span of the mixer lobes across the secondary flow path as a solution to the problem were essentially counterproductive. The limitation because marked and particularly obvious as lobe penetration of the secondary flow path was increased above about 40%.

FIG. 1 illustrates, in simplified terms, the type of nozzle in a bypass turbofan engine to which the invention applies. Typically, such engines comprise a tubular inner duct 10 surrounding a central plug or island 12 coaxial therewith to define an elongated generally annular primary flow chamber 14. One or more turbofans 16, in or adjacent the entrance of chamber 14, drive air through the chamber 14. Fuel injection means and associated combustion chamber provisions (not shown) function to heat and expand the incoming air within inner duct 10 and to generate combustion gasses for discharge as the primary flow. Such flow is confined by the inner duct 10 to be discharged rearwardly therefrom through its terminal multilobed mixing nozzle 18 having a discharge plane A—A designated the "Mixing Plane" in the figure illustrated. The fan 16 is symbolic. As such, it also serves to depict the added function in a turbofan engine of driving oncoming air through the annular space surrounding the inner duct 10 within the confines of an outer duct or shroud 20. Outer duct 20 starts to converge rearwardly at or forwardly of the inner duct mixing nozzle 18 and continues aft beyond the mixing plane A—A to a nozzle jet discharge or exhaust plane B—B. Ducts 10 and 20 are of generally annular tubular form, usually circular in cross section. In the mixing plane A—A the diameter of the outer duct 20 is usually somewhat larger (in the vicinity of one-third larger than the maximum spread diameter of the mixing nozzle lobes 18. Preferably, plug 12 extends beyond the mixing plane and converges to a tip in so doing, with the inner convolutions or valleys of the multilobed mixing nozzle 18 being spaced radially outward from the surface of the plug 12 by a small fraction (such as one-tenth) of the maximum radial extent of the crests or outer reaches of the nozzle lobes in the mixing plane A—A. The inner convolutions undergo a rearward convergency toward the plug from the inner duct 10 where they start. However, the convergence angle relative to the axis O—O is usually small (i.e., half-angle of the order of 24 degrees). The outer crests of the lobes of mixing nozzles 18 are swept back at an acute angle in relation to incident secondary flow. Sweepback at the forward end of the multilobe cluster starts at a small angle and gradually steepens to about 45 degrees before its drops off approaching exhaust plane A—A in a smooth transition.

Because of the outer duct's convergence, air making up the secondary flow entering the spaces between adjacent lobes in the nozzle 18 cluster is under sufficient pressure within the outer duct that such flow remains essentially attached in tracking or following the valley surfaces 18a1 the length of the mixing nozzle 18. However, hot gasses making up the primary flow turning and spreading radially outward into the lobe interior spaces loses pressure and rearward flow momentum partly by boundary layer friction losses and partly by the required turning angle, such that flow separation tends to occur in the zone shown in FIGS. 3 and 6a as "separation zone" causing eddying, flow reversals and consequent pressure loss reducing both jet thrust efficiency and the forced mixing effectiveness of the nozzle as a noise suppressor. In other words, as will be seen in FIG. 6a and FIG. 6b depicting the flow separation effect, not only does the attached condition of the rearward and outward flow deteriorate so as to limit lateral spread of the primary flow radially into and across the secondary flow region within the outer nozzle duct 20 to enhance mixing of the primary flow with the secondary flow at mixing plane A—A as desired, but the eddying and turning of primary flow air within the outer reaches of the lobe crests represent lost energy, energy not contributing to useful engine thrust.

In accordance with the present invention vent means are provided in the crest 18b of each inner duct nozzle lobe at locations immediately upstream of the regions within the lobe crest interior where flow separation otherwise tends to occur. These vents, preferably in the form of openings spanning across the respective lobes, are designed to intercept and inject secondary flow air into and along the primary flow boundary layer so as impart additional momentum energy to such boundary layer. It is found that, because of significant dynamic pressure differences between secondary flow gas (air) immediately outside each crest opening and that immediatey inside the same opening, there is a sufficient boosting effect that the desired attached flow characteristic within the lobes is maintained, allowing the primary flow to reach the very outer reaches of the lobe for discharge rearwardly at the mixing plane A—A. In some instances, a single transverse slot properly located will suffice. It is preferred to employ two or more such slots—18c1, 18c2—to serve as the lobe crest wall passage-forming openings, e.g., the vents, with such slots spaced lengthwise of the lobe crest as shown. As illustrated, such slots extend across a major portion of the width of the lobe crest, each lying generally in a plane perpendicular to the radial longitudinal plane of the lobe itself. Inasmuch as the lobe wall has substantial thickness in a practical nozzle the slot becomes a passage or tunnel (however short) through the wall. Because the slot is a passage or tunnel, it is important that the slot axis be angled to the longitudinal wall of the crest and oriented thereby substantially in the direction of secondary flow incident thereon. Thus oriented, each slot or lobe crest wall passage-forming openings captures maximum momentum energy of the incident secondary flow intercepted by the slot for booster injection into the primary flow boundary layer flowing along the crest interior wall. In the illustration, the slot axis of slots 18c1 and 18c2 in each instance is oriented at an angle $\alpha$ to a line or plane parallel with the nozzle axis O—O based on secondary flow direction determination in a working nozzle.

As will be appreciated, the optimum design size and orientation of the ventilation slots, as well as their proper locations along the lobe crests, will vary with the parameters of the installation. These variables may be computed using basic data on nozzle pressures, pressure gradients, velocities, as well as geometric parameters; and they may also be determined or verified by wind tunnel tests and through use of test prototypes. In most instances, a plurality of slots spaced along each nozzle lobe crest is necessary in order to maintain the necessary energy level in the boundary layer to keep it from separating or detaching from the lobe crest interior wall.

As will also be evident, the described secondary flow injection into the lobe interiors initiates and contributes to the overall mixing action between primary and secondary flow streams. The effect is appreciable. The injected secondary flow also provides a significant cooling effect on the interior walls of the mixer nozzle lobes, materially prolonging the useful life of this nozzle.

While, as indicated above, outer duct convergence and the relatively small convergence angle of the cluster of nozzle lobe valleys typically presents no problem of secondary flow separation in such valleys, it will nevertheless be recognized and appreciated that should there be a problem in these regions also, the principles of the invention may also be applied there. Vents or openings in the valley bottoms for injecting primary flow gasses into the secondary flow spaces between lobes along the valley bottoms will boost boundary layer energy so as to maintain boundary layer adherence along the valley surfaces.

While the preferred embodiment of the invention employs vent means in the form of a single arcuate slot at each vent location where primary flow boundary layer energy level boosting is needed, a plurality of smaller openings at each such locatoin may also be employed. When a single arcuate slot is used, it is prefereed that it span across the major portion of the outwardly convex crown or crest of the lobe with the slot midplane extending generally parallel to a longitudinal plane perpendicular to the radial extent of the lobe, other slot configurations may also be employed. The slots in most applications applied to arcuately curved lobe crests will subtend from 10 degrees to 45 degress of arc on either side of the crest longitudinal midline and they will range in height along the crest from a small fraction of an inch to several inches. Slot shape and dimensioning for best results will depend in each application upon lobe shape and dimensional parameters.

Figure 8:
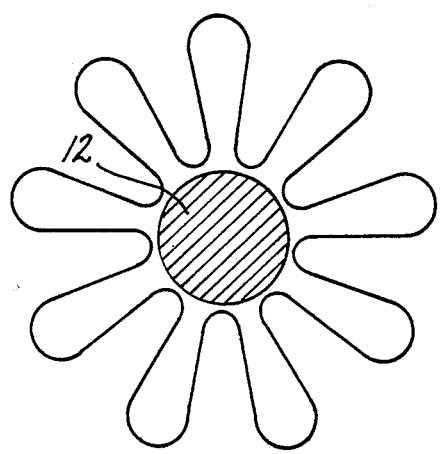
FIGS. 8 and 9 are rear end views illustrating alternative lobe configurations for the inner duct nozzle.
Figure 9:
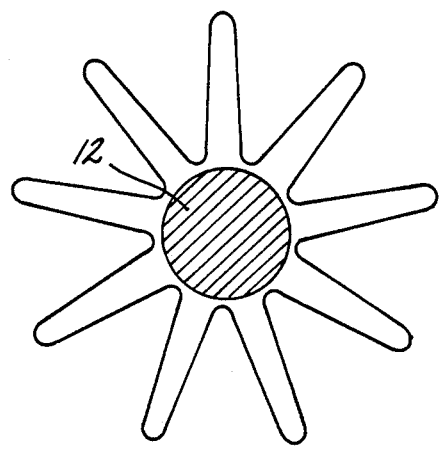

FIGS. 8 and 9 illustrate alternative slot configurations. That is FIG. 8 illustrates mixer nozzle lobes having side walls that converge at a small angle from the outer crests of the lobes to the valleys between lobes. In the form shown in FIG. 9, the lobe sides converge radially outwardly at a small acute angle.

These and other variations in the applications and embodiment forms of the invention are contemplated within the scope of the claims that follow.

The embodiments of the invention in which an exclusive property or privilege is claimed are defined as follows:

1. A thrust efficient noise suppression mixer nozzle for use in high-bypass ratio turbofan jet propulsion engines and the like having a combustion chamber to combine a primary discharge formed by engine combustion chamber discharge gases with a secondary discharge formed by ram air and fan-driven air, said nozzle comprising: (a) a flow confining and directing tubular inner duct for receiving said primary discharge and directing the same rearwardly in a primary jet flow along a nozzle axis; (b) a flow confining generally annular tubular outer duct coaxial with and surrouning said inner duct for receiving said secondary discharge and confining the same to flow rearwardly around and along said inner duct to be discharged rearwardly in a secondary jet flow along said nozzle axis, said inner duct having a generally annular tubular upstream portion that merges into a tubular multilobe discharge mixer downstream portion having circumferentially spaced alternating lobes and valleys, said lobes having outer crests that diverge rearwardly and outwardly from said nozzle axis at a divergence angle, said divergence angle being such that boundary layer separation of said primary discharge from the lobe crest interiors occurs at an intermediate location along said lobe crest interiors in the absence of a means for preventing such separation, said divergence angle and the interior of said flow confining generally annular tubular outer duct being such that the confined secondary discharge in the outer duct upon the lobe crest exteriors remains attached to the lobe valley exteriors; and, (c) means for preventing said boundary layer separation of said primary discharge comprising slots in said lobe crests located upstream of said intermediate locations, whereby said secondary discharge is forced into the lobe crest interiors, said secondary discharge adding rearwardly directed momentum energy to boundary layer flow within the lobe crests that prevents boundary layer separation of said primary discharge, and initiates mixing of the primary and secondary discharges within the inner duct.

2. The mixer nozzle defined in claim 1 wherein the outer duct converges rearwardly along the length of the tubular multilobe discharge mixer downstream portion of the inner duct and terminates aft of the multilobed portion of the inner duct.

3. The mixer nozzle defined in claim 1 wherein the outer duct converges rearwardly along the length of the tubular multilobe discharger mixer downstream portion of the inner duct and terminates aft of the multilobed portion of the inner duct, and further comprising a central plug within the inner duct tapering rearwardly and terminating aft of the inner duct.

4. The mixer nozzle defined in claims 1, 2 or 3 wherein the lobe crests are convexly rounded transversly of the nozzle and wherein said slots direct the injected secondary discharge of air generally along the lobe crest interior surfaces immediately downstream of said slots.

5. The mixter nozzle defined in claims 1, 2 or 3 wherein the lobe crests are convexly rounded transversely of the nozzle and wherein said slots direct the injected secondary discharge air generally along the lobe crest interior surfaces immediately downstream of said slots and wherein each of said slots extend arcuately across its respective lobe crest from side to side in a plane lying perpendicular to the nozzle axis and substantially perpendicular to the radial longitudinal extent of the lobe.

6. The mixer nozzle defined in claims 1, 2 or 3 wherein the lobe crests are convexly rounded tranversely of the nozzle and wherein said slots direct the injected secondary discharge air generally along the lobe crest interior surfaces immediately downstream of said slots, each lobe having a plurality of slots spaced apart along the crest of the lobe.

* * * * *